(12) United States Patent
Ranspach et al.

(10) Patent No.: US 9,599,052 B2
(45) Date of Patent: Mar. 21, 2017

(54) METHODS AND SYSTEM FOR CATALYST REACTIVATION

(71) Applicant: Ford Global Technologies, LLC, Dearborn, MI (US)

(72) Inventors: Paul Mahlon Ranspach, Allen Park, MI (US); Marc G. Uphues, Ann Arbor, MI (US); Allen Lehmen, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 29 days.

(21) Appl. No.: 14/151,660

(22) Filed: Jan. 9, 2014

(65) Prior Publication Data

US 2015/0192081 A1 Jul. 9, 2015

(51) Int. Cl.
*F01N 3/00* (2006.01)
*F02D 41/02* (2006.01)
*F02D 41/06* (2006.01)
*F02D 41/12* (2006.01)
*F02D 41/14* (2006.01)
*F02D 41/18* (2006.01)
*F02D 41/04* (2006.01)
*F02N 11/08* (2006.01)

(52) U.S. Cl.
CPC ....... *F02D 41/0295* (2013.01); *F02D 41/062* (2013.01); *F02D 41/126* (2013.01); *F02D 41/1456* (2013.01); *F02D 41/18* (2013.01); *F02D 41/042* (2013.01); *F02D 41/1461* (2013.01); *F02D 2200/0814* (2013.01); *F02N 11/0814* (2013.01)

(58) Field of Classification Search
USPC .......................... 60/274, 276, 280, 285, 286
See application file for complete search history.

(56) References Cited

U.S. PATENT DOCUMENTS

| | | | |
|---|---|---|---|
| 4,452,212 A | 6/1984 | Takase | |
| 5,020,495 A | 6/1991 | Plapp | |
| 5,438,826 A | 8/1995 | Blischke et al. | |
| 5,727,384 A | 3/1998 | Ma | |
| 6,021,638 A | 2/2000 | Hochmuth | |
| 6,226,982 B1 | 5/2001 | Poggio et al. | |
| 6,792,750 B2 * | 9/2004 | Nagai | B01D 53/9495 123/198 F |
| 6,993,899 B2 | 2/2006 | Lewis et al. | |
| 7,055,312 B2 * | 6/2006 | Osawa | B60W 10/06 180/65.235 |

(Continued)

OTHER PUBLICATIONS

Surnilla, Gopichandra et al., "Method and System for Improved Dilution Tolerance," U.S. Appl. No. 14/075,986, filed Nov. 8, 2013, 54 pages.

(Continued)

*Primary Examiner* — Binh Q Tran
(74) *Attorney, Agent, or Firm* — Julia Voutyras; John D. Russell; B. Anna McCoy (57) ABSTRACT

Embodiments for reactivating a catalyst are provided. In one example, a method for reactivating a catalyst coupled to an engine comprises when the engine is restarted following deactivation, adjusting a degree of fuel enrichment based on an engine off duration and an engine air amount during the restart.

17 Claims, 5 Drawing Sheets

(56) References Cited

U.S. PATENT DOCUMENTS

| | | | |
|---|---|---|---|
| 7,059,116 B2* | 6/2006 | Kusada | B60K 6/485 |
| | | | 123/406.46 |
| 7,207,306 B2* | 4/2007 | Kondo | F01L 1/053 |
| | | | 123/179.18 |
| 7,454,900 B2 | 11/2008 | Hayashi | |
| 8,096,125 B2 | 1/2012 | Hepburn et al. | |
| 8,133,157 B2 | 3/2012 | Doering et al. | |
| 8,347,609 B2 | 1/2013 | Hepburn et al. | |
| 8,347,611 B2 | 1/2013 | Hepburn et al. | |
| 8,413,421 B2* | 4/2013 | Fujimoto | F01N 11/007 |
| | | | 60/276 |
| 8,516,799 B2 | 8/2013 | Hepburn et al. | |
| 8,820,049 B2* | 9/2014 | Lewis | F02D 13/06 |
| | | | 123/21 |
| 8,949,001 B2* | 2/2015 | Suzuki | F02D 41/3005 |
| | | | 123/691 |
| 8,984,865 B2* | 3/2015 | Tanaka | F02D 41/123 |
| | | | 502/327 |
| 2014/0039778 A1 | 2/2014 | Kerns et al. | |
| 2014/0039781 A1 | 2/2014 | Theis et al. | |

OTHER PUBLICATIONS

Shengqin, L., "Emissions Performance Study of Oxygen-enriched Combustion on Spark-ignition Engine at Cold-start," ICICTA, vol. 2, pp. 204-207, 2010 International Conference on Intelligent Computation Technology and Automation, 4 pages.

Anonymous, "Method for reducing cold start emissions by applying a rich pulse during lean operating engine shut down," IPCOM No. 000212173, Published Nov. 3, 2011, 3 pages.

* cited by examiner

METHODS AND SYSTEM FOR CATALYST REACTIVATION

FIELD

The present disclosure relates to an exhaust aftertreatment device for an engine.

BACKGROUND AND SUMMARY

A three-way catalyst positioned in an engine exhaust path provides both oxidation and reduction characteristics to lower tailpipe emissions for hydrocarbons, carbon monoxide, and nitrogen oxides (NOx). When the engine is stopped, the exhaust flow through the catalyst is halted and the catalyst acts like a sponge, thus accumulating oxygen. The longer the engine is off, the more oxygen is accumulated by the catalyst, up to the catalyst's oxygen saturation point, which is a function of catalyst temperature. This additional oxygen stored during the engine stop may be compensated for during the ensuing engine start. Without compensation, the catalyst's ability to reduce NOx will be significantly impacted. In order to compensate for the stored oxygen, additional fuel may be added on the restart to "reactivate" the catalyst's reduction capability. This assures that the generated emissions are minimized during every engine restart.

Many engine off events result in the catalyst becoming saturated with oxygen. As such, most engine restarts are performed under the assumption that the catalyst is saturated, and thus a relatively high amount of fuel is provided to reactivate the catalyst. However, during certain engine restarts, such as following an automatic engine stop, the engine off duration may be relatively short, resulting in only partial catalyst saturation. Performing a standard reactivation with the relatively high fuel enrichment on a partially saturated catalyst may result in more fuel than necessary being supplied to the catalyst, increasing hydrocarbon emissions and wasting fuel.

The inventors have recognized the issues with the above approach and offer a method to at least partly address them. In one embodiment, a method for reactivating a catalyst coupled to an engine comprises when the engine is restarted following deactivation, adjusting a degree of fuel enrichment based on an engine off duration and an engine air amount during the restart.

In this way, the amount of oxygen stored in the catalyst may be approximated based on the duration of the engine off period following engine deactivation. The degree of enrichment provided to the engine during the restart may be based on the engine off period to convert the stored oxygen and thus reactivate the catalyst. Further, one or more parameters of the enrichment, such as the relative richness and/or duration of the enrichment, may be adjusted based on the air flow to the engine. Accordingly, the enrichment may be matched to the air flow to provide a precise amount of extra fuel to the engine to reactivate the catalyst without wasting fuel or producing excess emissions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
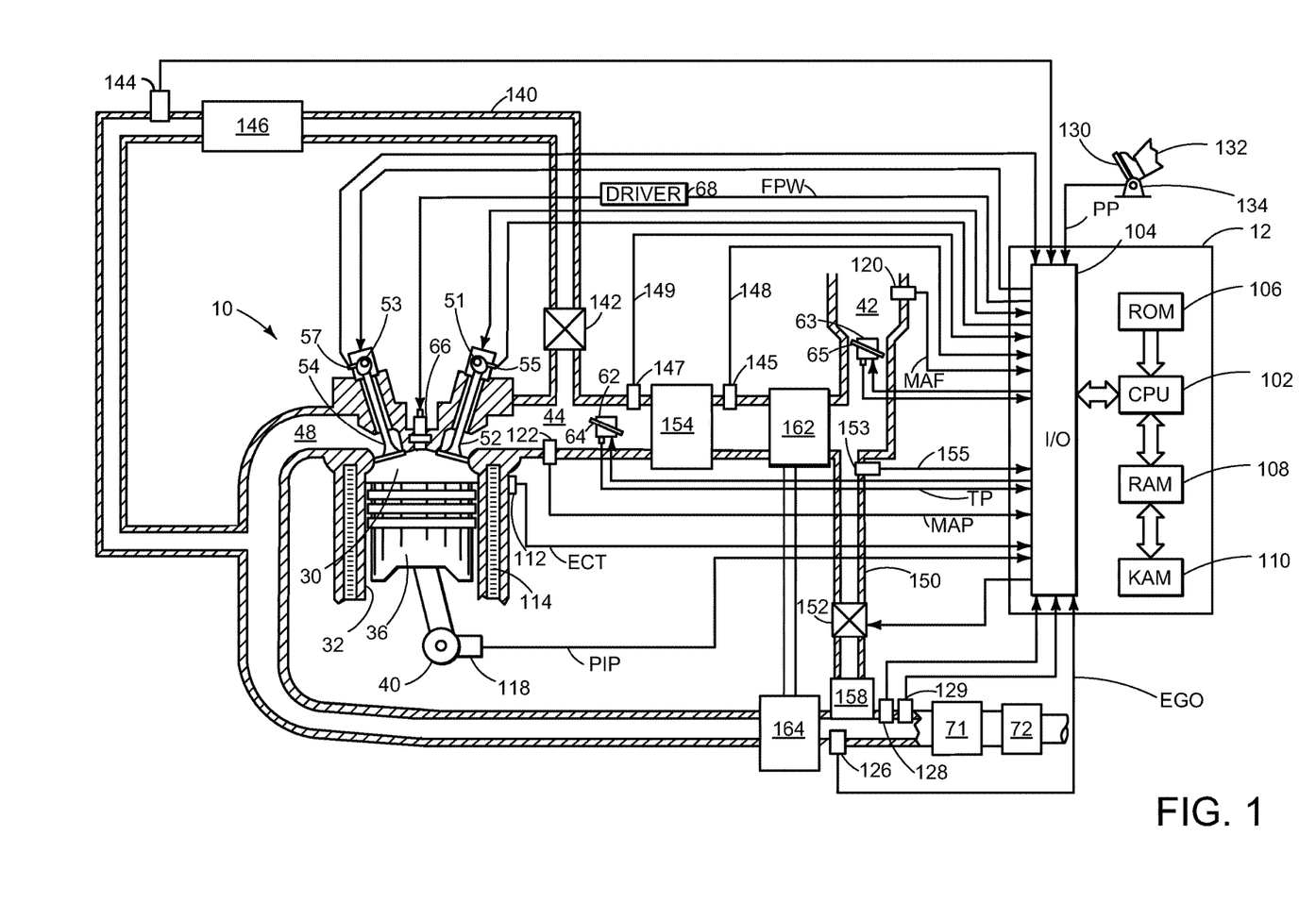
FIG. 1 shows a schematic diagram of one cylinder of multi-cylinder engine.

During an engine off period, such as when an engine is temporarily shut down during an idle or automatic stop, a catalyst positioned in an exhaust passage downstream of the engine may begin to store oxygen. The stored oxygen reduces the catalyst's ability to convert emissions in the exhaust, particularly NOx. Accordingly, during a restart of the engine, extra fuel may be injected to the engine. The extra fuel, which is not combusted in the engine, is included in the exhaust provided to the catalyst, where it converts the stored oxygen, freeing the catalyst to convert the exhaust emissions. To ensure excess fuel is not provided to the catalyst, the amount of oxygen stored in the catalyst may be approximated by the engine off duration and the manner in which the extra fuel is delivered (e.g., the engine air-fuel ratio and/or duration of the enrichment) may be adjusted to match the fuel delivery to the engine air flow. FIG. 1 shows an engine having a catalyst and a controller configured to carry out the methods of FIGS. 2-3. FIGS. 4A-5B show various operating parameters during multiple different catalyst reactivation events.

Referring now to FIG. 1, it shows a schematic diagram of one cylinder of multi-cylinder engine 10, which may be included in a propulsion system of an automobile, is shown. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. In some embodiments, the face of piston 36 inside cylinder 30 may have a bowl. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail.

Combustion in engine 10 can be of various types, depending on operating conditions. While FIG. 1 depicts a compression ignition engine, it will be appreciated that the embodiments described herein may be used in any suitable engine, including but not limited to, diesel and gasoline compression ignition engines, spark ignition engines, direct or port injection engines, etc. Further, various fuels and/or fuel mixtures such as diesel, bio-diesel, etc, may be used.

Intake passage 42 may include throttles 62 and 63 having throttle plates 64 and 65, respectively. In this particular example, the positions of throttle plates 64 and 65 may be varied by controller 12 via signals provided to an electric motor or actuator included with throttles 62 and 63, a configuration that is commonly referred to as electronic throttle control (ETC). In this manner, throttles 62 and 63 may be operated to vary the intake air provided to combustion chamber 30 among other engine cylinders. The positions of throttle plates 64 and 65 may be provided to controller 12 by throttle position signals TP. Pressure, temperature, and mass air flow may be measured at various points along intake passage 42 and intake manifold 44. For example, intake passage 42 may include a mass air flow sensor 120 for measuring clean air mass flow entering through throttle 63. The clean air mass flow may be communicated to controller 12 via the MAF signal.

Engine 10 may further include a compression device such as a turbocharger or supercharger including at least a compressor 162 arranged upstream of intake manifold 44. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12. Various turbocharger arrangements may be used. For example, a variable nozzle turbocharger (VNT) may be used when a variable area nozzle is placed upstream and/or downstream of the turbine in the exhaust line for varying the effective expansion of gasses through the turbine. Still other approaches may be used for varying expansion in the exhaust, such as a waste gate valve.

A charge air cooler 154 may be included downstream from compressor 162 and upstream of intake valve 52. Charge air cooler 154 may be configured to cool gases that have been heated by compression via compressor 162, for example. In one embodiment, charge air cooler 154 may be upstream of throttle 62. Pressure, temperature, and mass air flow may be measured downstream of compressor 162, such as with sensor 145 or 147. The measured results may be communicated to controller 12 from sensors 145 and 147 via signals 148 and 149, respectively. Pressure and temperature may be measured upstream of compressor 162, such as with sensor 153, and communicated to controller 12 via signal 155.

Further, in the disclosed embodiments, an EGR system may route a desired portion of exhaust gas from exhaust passage 48 to intake manifold 44. FIG. 1 shows an HP-EGR system and an LP-EGR system, but an alternative embodiment may include only an LP-EGR system. The HP-EGR is routed through HP-EGR passage 140 from upstream of turbine 164 to downstream of compressor 162. The amount of HP-EGR provided to intake manifold 44 may be varied by controller 12 via HP-EGR valve 142. The LP-EGR is routed through LP-EGR passage 150 from downstream of turbine 164 to upstream of compressor 162. The amount of LP-EGR provided to intake manifold 44 may be varied by controller 12 via LP-EGR valve 152. The HP-EGR system may include HP-EGR cooler 146 and the LP-EGR system may include LP-EGR cooler 158 to reject heat from the EGR gases to engine coolant, for example.

Under some conditions, the EGR system may be used to regulate the temperature of the air and fuel mixture within combustion chamber 30. Thus, it may be desirable to measure or estimate the EGR mass flow. EGR sensors may be arranged within EGR passages and may provide an indication of one or more of mass flow, pressure, temperature, concentration of $O_2$, and concentration of the exhaust gas. For example, an HP-EGR sensor 144 may be arranged within HP-EGR passage 140.

In some embodiments, one or more sensors may be positioned within LP-EGR passage 150 to provide an indication of one or more of a pressure, temperature, and air-fuel ratio of exhaust gas recirculated through the LP-EGR passage. Exhaust gas diverted through LP-EGR passage 150 may be diluted with fresh intake air at a mixing point located at the junction of LP-EGR passage 150 and intake passage 42. Specifically, by adjusting LP-EGR valve 152 in coordination with first air intake throttle 63 (positioned in the air intake passage of the engine intake, upstream of the compressor), a dilution of the EGR flow may be adjusted.

A percent dilution of the LP-EGR flow may be inferred from the output of a sensor 145 in the engine intake gas stream. Specifically, sensor 145 may be positioned downstream of first intake throttle 63, downstream of LP-EGR valve 152, and upstream of second main intake throttle 62, such that the LP-EGR dilution at or close to the main intake throttle may be accurately determined. Sensor 145 may be, for example, an oxygen sensor such as a UEGO sensor.

Exhaust gas sensor 126 is shown coupled to exhaust passage 48 downstream of turbine 164. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), HC, or CO sensor. Further, exhaust passage 48 may include additional sensors, including a NOx sensor 128 and a particulate matter (PM) sensor 129, which indicates PM mass and/or concentration in the exhaust gas. In one example, the PM sensor may operate by accumulating soot particles over time and providing an indication of the degree of accumulation as a measure of exhaust soot levels.

Emission control devices 71 and 72 are shown arranged along exhaust passage 48 downstream of exhaust gas sensor 126. Devices 71 and 72 may be a selective catalytic reduction (SCR) system, three way catalyst (TWC), $NO_x$ trap, various other emission control devices, or combinations thereof. For example, device 71 may be a TWC and device 72 may be a particulate filter (PF). In some embodiments, PF 72 may be located downstream of TWC 71 (as shown in FIG. 1), while in other embodiments, PF 72 may be positioned upstream of TWC 72 (not shown in FIG. 1).

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injector, etc.

Engine 10 may be configured to perform automatic stop/starts during certain conditions in order to conserve fuel. For example, when engine speed is below a threshold (e.g., at idle speed), vehicle speed is less than a threshold speed (e.g., zero) the accelerator pedal is depressed by less than a threshold amount, and/or the brake pedal is depressed by more than a threshold amount, it may indicate the vehicle is entering a long idle mode, such as when stopped at a stoplight. In response to such conditions, the engine may automatically shut down by ceasing fuel injection without a shutdown request from the vehicle operator. Further, in some embodiments, the intake and exhaust valves may close. Due to the slow or no vehicle and engine speed and lack of fuel injection, the engine stops spinning. The engine may then be automatically started when the vehicle operator releases the brake pedal and presses the accelerator pedal.

During the duration when the engine is off following an automatic stop, some oxygen-containing exhaust and/or air may reach the catalyst. The oxygen in the exhaust reaching the catalyst may be stored in the catalyst, as no reactants may be present to react with the oxygen (e.g., no NOx or hydrocarbons may be present in the catalyst). Then, during and immediately following the automatic start, the presence of the oxygen in the catalyst may reduce the catalyst's ability to convert NOx, hydrocarbons, and/or other emissions. To ensure the engine out emissions are converted in the catalyst following an automatic restart, additional fuel may be injected to the engine, referred to as a fuel enrichment, in order to bring the catalyst back to its pre-engine stop oxygen storage level (e.g., reactivate the catalyst). The additional fuel may be a sum of fuel beyond the fuel needed to provide the requested engine torque. In some examples, the fuel enrichment may include operation at an air-fuel ratio below stoichiometry.

The duration that the engine is off following an automatic stop may vary greatly, and thus the amount of oxygen stored in the catalyst during the engine off duration may vary among different automatic stop/start events. To ensure an amount of additional fuel provided during the fuel enrichment is matched to the amount of oxygen stored in the catalyst, the engine off duration may be monitored and the degree of enrichment may be based on the engine off duration. For example, as the engine off duration increases, the sum of total additional fuel added during the enrichment may increase. Further, one or more aspects of the enrichment may vary depending on the engine air amount during the enrichment and/or desired engine emissions. In one example, the relative richness of the enrichment (e.g., how much extra fuel beyond the fuel needed to provide requested torque) may be adjusted and/or the duration of the enrichment may be adjusted based on the engine air amount during the restart. Further, the relative richness of the enrichment may affect the levels of NOx and/or hydrocarbons produced by the engine. Thus, the level of enrichment may be tailored based on desired engine out emissions.

Figure 2:
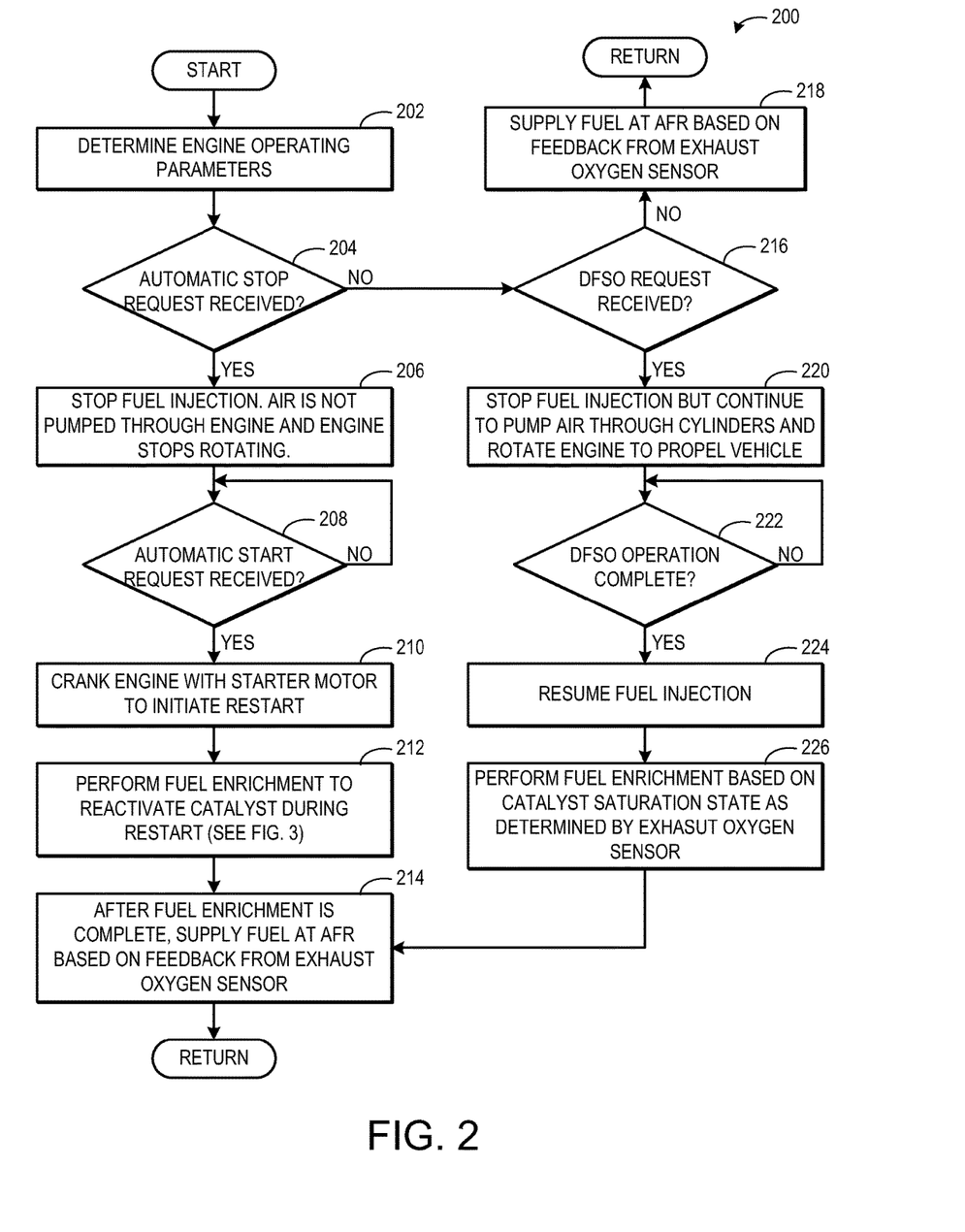
FIGS. 2-3 are flow charts illustrating methods for reactivating a catalyst according to embodiments of the present disclosure.

FIG. 2 is a method 200 for performing a catalyst reactivation following an engine off period. The method of FIG. 2 may be carried out by a controller, such as controller 12 of FIG. 1, according to non-transitory instructions stored on the controller. Method 200 may adjust the amount of fuel provided to the engine based on various parameters, such as whether the engine off was precipitated by an automatic stop or deceleration fuel cut off, the duration of the engine off, an engine air amount (determined based on intake manifold pressure from MAP sensor 122 and/or mass air flow from MAF sensor 120, for example), and/or engine and/or tailpipe emissions (determined from various exhaust sensors, such as NOx and oxygen sensors), in order to reactivate a catalyst positioned in the exhaust passage downstream of the engine, such as aftertreatment device 71 and/or 72. In one example, the catalyst may be a three-way catalyst.

At 202, method 200 includes determining engine operating parameters. The engine operating parameters determined may include, but are not limited to, engine speed, engine load, vehicle speed, brake and accelerator pedal positions, exhaust air-fuel ratio from one or more exhaust oxygen sensors, exhaust NOx levels from an exhaust NOx sensor, MAP, MAF, and other parameters. At 204, method 200 includes determining if an automatic stop request is received. An automatic stop may be performed when engine speed, load, and/or vehicle speed are below respective thresholds, the accelerator pedal is depressed by less than a threshold amount, and/or the brake pedal is depressed by more than a threshold amount. If an automatic stop request is not received, method 200 proceeds to 2xx to determine if a deceleration fuel shut off (DFSO) request is received, which will be explained in more detail below.

If an automatic stop request is received, method 200 proceeds to 206 to stop fuel injection. During the automatic stop, air is not pumped through the engine, and the engine stops rotating. At 208, method 200 includes determining if an automatic start request is received. The automatic start may be performed if, following the automatic stop, the accelerator pedal is depressed by more than a threshold amount, and/or the brake pedal is depressed by less than a threshold amount (e.g., the vehicle operator releases the brake pedal and depresses the accelerator pedal). If an automatic start request is not received, method 200 continues waiting to receive an automatic start request with the engine off.

If an automatic start request is received, method 200 proceeds to 210 to crank the engine with the starter motor to initiate the restart. At 212, a fuel enrichment is performed to reactivate the catalyst during the restart, which will be described in more detail below with respect to FIG. 3. Briefly, the fuel enrichment is performed once fuel injection to operate the engine commences. The fuel enrichment includes injecting extra fuel beyond the fuel needed to provide the requested torque to reactivate the catalyst. The amount of extra fuel provided may be based on the duration of the engine off period prior to the engine restart. Further, the relative richness of the enrichment and/or duration of the enrichment may be adjusted based on the engine air amount requested during the restart.

At 214, after the fuel enrichment is complete, the fuel is supplied to the engine at an air-fuel ratio based at least in part on feedback from an exhaust oxygen sensor. For example, the air fuel ratio may be controlled to be stoichiometry to maintain the catalyst at a desired activity level. Method 200 then returns.

Returning to 204, if the engine is not undergoing an automatic stop, method 200 proceeds to 216 to determine if a DFSO request is received. DFSO may include cessation of fuel injection during a deceleration event where the vehicle is coasting and thus little or no engine torque is needed to propel the vehicle. Because the vehicle is still moving, air may be pumped through the engine. As such, the catalyst may receive a relatively higher amount of oxygen and become fully saturated with oxygen. Accordingly, the reactivation of the catalyst after the DFSO event is complete may be different than the catalyst reactivation following the automatic stop.

DFSO may be initiated based on engine speed and/or load being below a threshold, vehicle speed being above a threshold, and/or other parameters. If the engine is not operating under DFSO conditions, method 200 proceeds to 218 to maintain fuel injection at a designated amount to provide a desired air-fuel ratio based on feedback from an exhaust oxygen sensor, and then method 200 returns.

If the engine is operating with conditions for DFSO, method 200 proceeds to 220 to stop fuel injection to the engine but continue to pump air through the cylinders and rotate the engine. As such, the vehicle in which the engine is installed may continue to operate due to momentum from previous engine operation and/or gravity (e.g., it is coasting down a hill). At 222, method 200 determines if the DFSO operation is complete. DFSO may be stopped when engine speed and/or vehicle speed drops below a threshold, and/or when requested torque increases (e.g., the vehicle operator depresses the accelerator pedal to increase the speed of the vehicle). If DFSO operation is not complete, method 200 continues to operate in DFSO and wait for DFSO operation to end.

If DFSO operation is complete, method 200 proceeds to 224 to resume fuel injection to maintain the engine at requested torque. During the initial fuel injection events, a fuel enrichment may be performed, as indicated at 226, based on the catalyst saturation state as determined by feedback from an exhaust oxygen sensor. For example, during the DFSO operation the exhaust oxygen sensor may measure the amount of oxygen in the exhaust and the controller may determine how much oxygen was stored in the catalyst during the DFSO operation. The amount of extra fuel provided during the enrichment following the DFSO operation may be based on the amount of oxygen stored in the catalyst as determined based on the feedback from the oxygen sensor. In some embodiments, it may be assumed that the catalyst is saturated following a DFSO operation, and a predetermined amount of fuel may be provided during the enrichment following the DFSO. Method 200 then proceeds to 214 to supply fuel at a designated AFR based on feedback from the exhaust sensor (e.g., without enrichment), and then method 200 returns.

Thus, method 200 of FIG. 2 provides for performing a catalyst reactivation following an engine off period. If the engine off period is precipitated by an automatic stop, the duration of the engine off period may be relatively short and a relatively smaller amount of oxygen may be stored in the catalyst. Accordingly, the amount of extra fuel provided during the fuel enrichment may be based on the engine off duration to match the amount of extra fuel to the amount of oxygen stored in the catalyst, independent of feedback from the exhaust oxygen sensor. In contrast, if the engine off is precipitated by a DFSO operation, a relatively large amount of oxygen may be stored in the catalyst. As such, the catalyst reactivation may include an enrichment having an extra amount fuel that is either predetermined (assuming the catalyst gets saturated during the DFSO) or that is based on feedback from the exhaust oxygen sensor.

Figure 3:
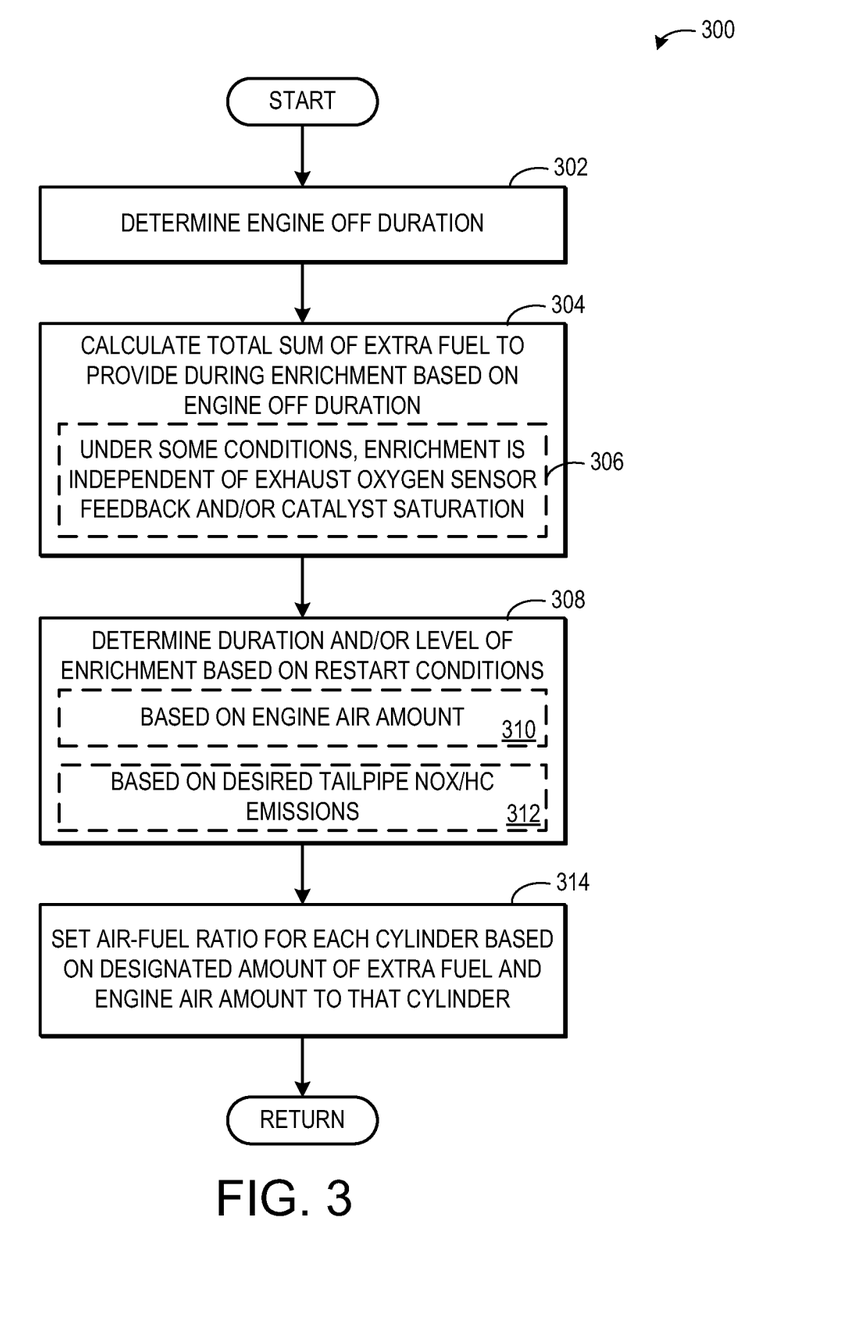

FIG. 3 is a flow chart illustrating a method 300 for performing a catalyst reactivation following an engine off duration during an automatic engine restart. Method 300 may be executed during the execution of method 200, as explained above, in response to an automatic engine restart following an automatic engine stop.

At 302, method 300 includes determining the duration of the engine off period. In one example, the engine off duration may be the time from when the fuel injection stops during the automatic stop until the time the starter motor starts cranking the engine during the restart. In other examples, the engine off period may start when the engine stops spinning and/or may stop when the fuel injection starts during the restart.

At 304, the total sum of extra fuel to provide during the enrichment is calculated based on the engine off duration. In one example, the total sum of extra fuel may increase linearly with the increasing engine off duration. In other examples, the total sum of extra fuel may have a different relationship to the engine off duration.

As indicated at 306, under some conditions the total sum of extra fuel may be based solely on the engine off duration, independent of other factors such as feedback from an exhaust oxygen sensor. As explained previously with respect to FIG. 2, an exhaust oxygen sensor may be used to estimate the amount of oxygen stored in the catalyst, and/or detect when a rich breakthrough has occurred (indicating that reactivation of the catalyst is complete). However, if the engine off duration is relatively short, as frequently occurs during an automatic stop, the enrichment duration may be so short that it may end before the exhaust oxygen sensor is able to respond. For example, during the engine off period, the exhaust oxygen sensor may decrease in temperature, be deactivated, or experience another condition that renders the output from the sensor invalid for a period of time following the engine restart. Once the engine is restarted, a flag indicating that the oxygen sensor output is valid may be set once the sensor is warmed up or is otherwise operational. After the flag is set, the output from the sensor may be utilized in the engine control strategy, for example to control engine air-fuel ratio.

If the engine off duration is so short that it is predicted the enrichment will end before the flag is set, the enrichment may be based solely on the engine off duration to avoid excess fuel being provided beyond the amount of fuel needed to reactivate the catalyst. However, if the enrichment is predicted to be relatively large due to a long engine off period, for example, the output from the exhaust oxygen sensor may be used to control the duration of the enrichment, for example by detecting a lean to rich switch indicative that the reactivation is complete. However, in some conditions even if the enrichment is performed when the sensor is valid, the amount of enrichment may be so small and/or so early in the starting process, that even if the sensor was working it may still provide output too late in the enrichment process due to transport delays, sensor response time, etc.

At 308, the duration and/or level of enrichment may be determined based on restart conditions. As indicated at 310, the duration and/or level of enrichment may be based on an engine air amount during the enrichment. The engine air amount may be the mass air flow of air into the engine in one example. In another example, the engine air amount may be the amount of charge air provided to each cylinder, determined based on a cylinder filling model that includes MAP, MAF, other sources of charge air (such as EGR), engine speed, etc. The engine air amount may be determined starting with the engine-restart initiating accelerator pedal depression and including requested and/or delivered air amounts during the engine cranking and/or one or more combustion events of the restart. In one example, the engine air amount may be further determined during each combustion event for the duration of the enrichment.

While the total sum of extra fuel provided during the restart may be based only on the engine off duration, the manner in which that extra fuel is delivered may be based on the engine air amount such that, for each cylinder combustion event during the enrichment, a target air-fuel ratio is achieved that delivers a given portion of the extra fuel to match the amount of air entering the cylinder. In one example, the duration of the enrichment may be a function of the engine air amount. For example, the duration of the enrichment may increase as the engine air amount increases. The amount of air flow into the engine may be measured or calculated and the duration of enrichment may be based on the accumulated air flow through the catalyst, where air flow into the engine is equal to the air flow out through the catalyst. When the accumulated air flow into the engine reaches a threshold, the enrichment may be transitioned out and stopped. In one example, an air flow clock may be set at engine stop, and upon restart the clock may be counted down by measured air flow increments until it expires.

In another example, the relative richness of the enrichment may be a function of the engine air amount. For example, as the engine air amount increases, the relative richness of the enrichment may decrease. Accordingly, in some examples, as the engine air amount increases, the duration of the enrichment may increase, but each cylinder may be provided with less extra fuel such that the given total extra sum of fuel is provided over the course of the enrichment. Other adjustments to the enrichment are possible based on the engine air amount. For example, if the engine air amount during the initial portion of the restart is relatively high compared to the engine air amount for a later portion of the restart, the relative richness of the initial portion of the restart may be decreased, but as the restart progresses and the engine air amount decreases, the relative richness of the enrichment may increase. Further, in some examples, the duration and/or richness of the enrichment may be adjusted based on the number of combustion events since the restart was initiated. For example, as the number of combustion events increases, the relative richness may decrease.

Other restart conditions may also affect the parameters of the enrichment. As indicated at 312, the duration and/or level of the enrichment may be based on desired tailpipe NOx and/or HC emissions. For example, a higher level of richness may result in increased HC emissions but decreased NOx emissions. Accordingly, if feedback from the NOx sensor indicates that NOx emissions are higher than desired, the relative richness of the enrichment may be increased. If the relative richness of the enrichment is adjusted, the duration of the enrichment may be concurrently adjusted to ensure that only the total sum of extra fuel is delivered, and not additional fuel beyond that needed for the reactivation and to deliver requested torque.

Prior to the first fuel injection event, an initial engine air amount may be determined, and the parameters of the enrichment (e.g., relative richness and duration) may be set based on the initial engine air amount and engine off duration. Then, as indicated at 314, the air-fuel ratio for the first cylinder to receive fuel may be set based on the designated amount of extra fuel and engine air amount to be delivered to that cylinder. As engine operation proceeds and the remaining cylinders are fueled, the air fuel ratio for each cylinder may be adjusted to continue to provide the designated extra portion of fuel and engine air amount. As the engine air amount changes, the air-fuel ratio may be adjusted. Further, the relative richness and/or duration may also be adjusted until the total amount of extra fuel has been delivered to the catalyst.

Figure 4A:
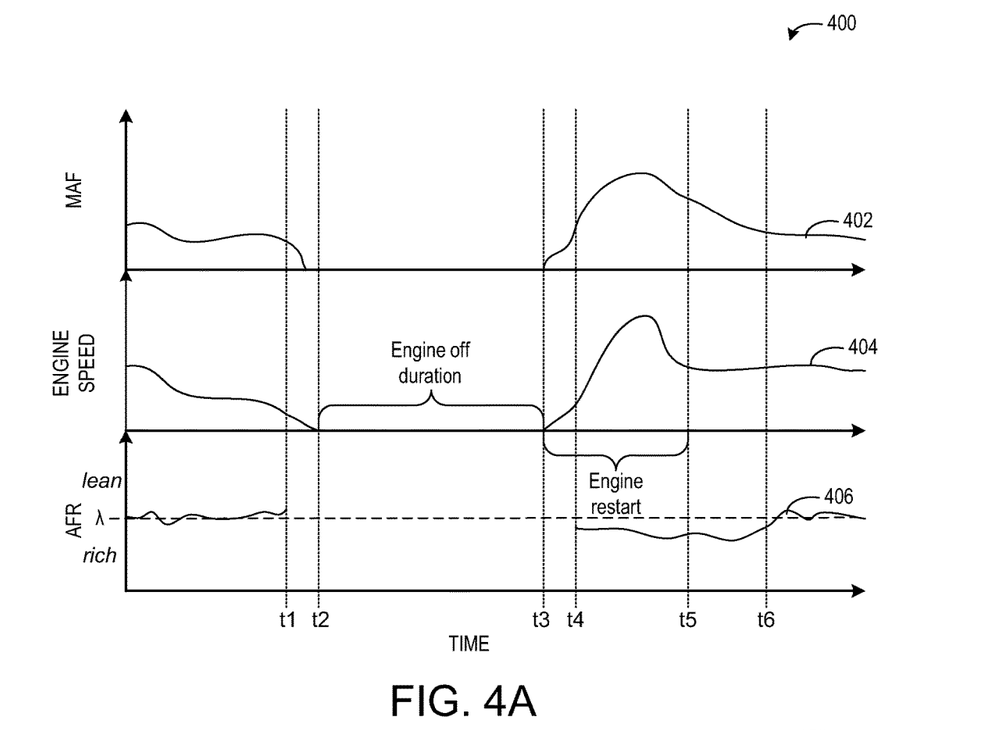
FIGS. 4A and 4B are diagrams illustrating various operating parameters during a catalyst reactivation event according to an embodiment of the present disclosure.
Figure 4B:
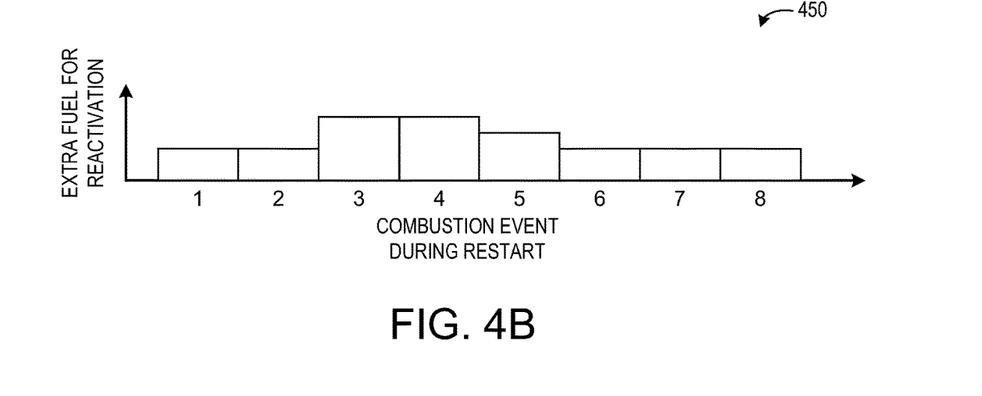
Figure 5A:
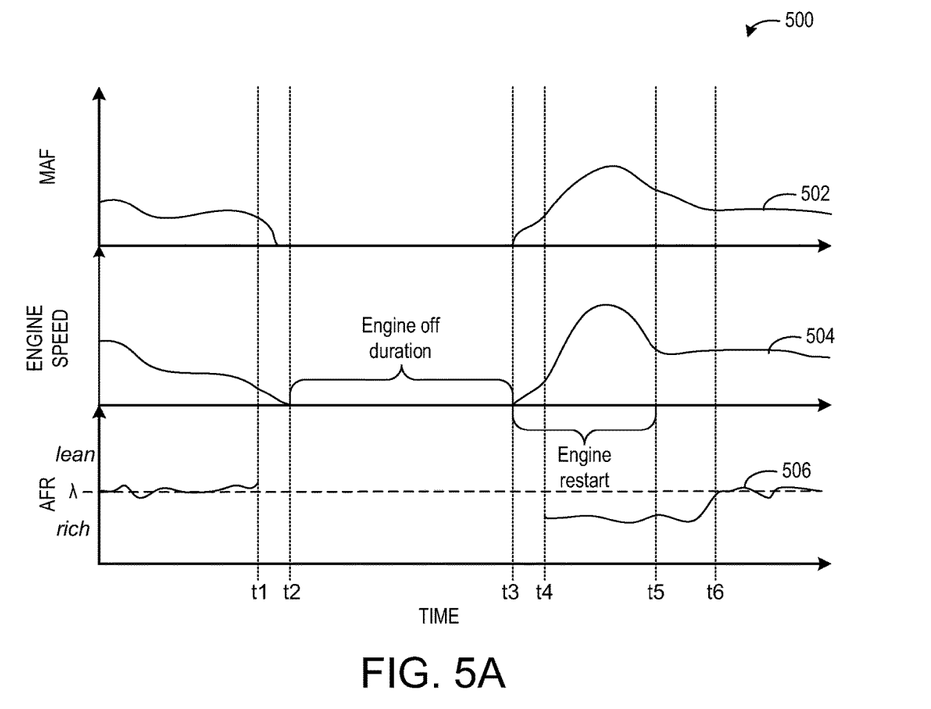
FIGS. 5A and 5B are diagrams illustrating various operating parameters during a catalyst reactivation event according to another embodiment of the present disclosure.
Figure 5B:
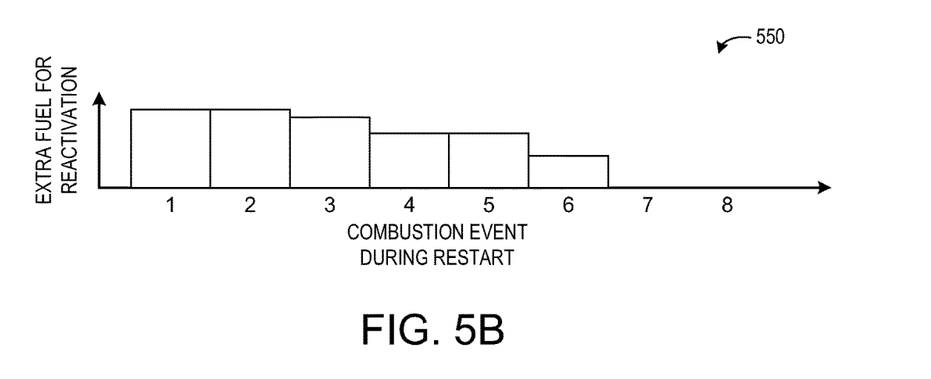

FIGS. 4A and 4B illustrate various operating parameters during a first catalyst reactivation event following an engine automatic start, while FIGS. 5A and 5B illustrate the operating parameters during a second catalyst reactivation event following a different automatic start. FIGS. 4A and 5A are diagrams 400 and 500, respectively, and each illustrate engine air amount (herein shown as mass air flow, although other air amounts are possible), engine speed, and air-fuel ratio as a function of time. FIGS. 4B and 5B are diagrams 450 and 550, respectively, and each illustrate an amount of extra fuel delivered for catalyst reactivation for a subset of combustion events during the respective restart.

Referring first to FIGS. 4A and 4B, prior to time t1, the engine is operating at stoichiometric air-fuel ratio, as shown by curve 406. Engine speed, as shown by curve 404, is initially at mid-speed, but lowers as time approaches t1. Similarly, MAF, illustrated by curve 402, decreases as time approaches t1. At t1, an automatic stop request is received. Accordingly, fuel injection is stopped (and thus there are no values for AFR) and the engine spins down to a stop at time t2. The engine is off until time t3, where an automatic start request is received. The starter motor is activated at time t3 and the engine is cranked. As such, both MAF and engine speed start to increase. At time t4, fuel injection is initiated. As illustrated by curve 406, the AFR is below stoichiometry due to the fuel enrichment to reactivate the catalyst. At t5, the engine restart is complete (the engine has spun up and stabilized at idle engine speed, for example). The catalyst reactivation continues until time t6. The total amount of extra fuel added during the reactivation is based on the engine off duration. Further, the engine air amount during the restart may be monitored and the parameters of the reactivation may be adjusted based on the engine air amount.

A specific amount of extra fuel is added to each cylinder for each combustion event during the reactivation. In some embodiments, each cylinder (and each combustion event) may receive the same amount of extra fuel, where the amount of extra fuel is determined based on the engine off duration. However, as shown in FIG. 4B, in some embodiments the amount of extra fuel added to each cylinder may vary per combustion event. In FIG. 4B, the first two illustrated combustion events, as well as the last three illustrated combustion events, receive the same amount of extra fuel. Combustion events 3, 4, and 5, on the other hand, each receive more extra fuel than the other combustion events. The extra fuel added to these combustion events may be based on the engine air amount. For example, the engine air amount during these combustion events may be higher than the other combustion events, and thus more fuel may be added during these events. In some examples, the engine air-fuel ratio may be maintained the same over all eight sample combustion events, while in other examples, the engine air-fuel ratio may be different between combustion events. For example, combustion event four may have a lower (e.g., richer) air-fuel ratio than combustion event five. Regardless of the cylinder-to-cylinder variation of air-fuel ratio, the total sum of extra fuel over the course of the reactivation may be predetermined based on the engine off duration.

FIG. 5A illustrates operating parameters during another catalyst reactivation. Similar to the reactivation event illustrated in FIG. 4A, MAF (curve 502), engine speed (curve 504), and AFR (curve 506) are illustrated. The reactivation event of FIG. 5A is initiated following an engine automatic stop/start event, which occurs similarly to the stop/start of FIG. 4A (e.g., the AFR, engine speed, and MAF prior to time t4 are the same between FIGS. 4A and 5A). However, during the automatic restart of FIG. 5A, the accelerator pedal may be depressed by a lesser amount than during the restart of FIG. 4A. Accordingly, a smaller amount of engine air may be present during the restart of FIG. 5A, as shown by curve 502. Due to the relatively smaller engine air amount, the engine air-fuel ratio of FIG. 5A (illustrated by curve 506) may be different than the air-fuel ratio of FIG. 4A. For example, the AFR of FIG. 5A may be more rich than the AFR of FIG. 4A, yet the duration of the enrichment may be shorter in FIG. 5A than in FIG. 4A.

FIG. 5B illustrates the amount of extra fuel added to each combustion event of eight example combustion events of the reactivation of FIG. 5A. The first two combustion events may receive the most extra fuel, with each subsequent combustion event receiving a smaller amount of extra fuel. Combustion events seven and eight receive no appreciable extra fuel.

The engine off duration of the operating period of FIG. 5A is the same as the engine off duration of the operating period of FIG. 4A. As such, the total sum of extra fuel added during the eight combustion events illustrated in FIG. 4B is equal to the total sum of extra fuel added during the eight combustion events illustrated in FIG. 5B.

Thus, the methods and systems described herein provide for a method for reactivating a catalyst coupled to an engine. In an embodiment, the method comprises when the engine is restarted following deactivation, adjusting a degree of fuel enrichment based on an engine off duration and an engine air amount during the restart. The deactivation comprises automatically stopping the engine based on one or more of an accelerator pedal position, brake pedal position, and engine speed, and wherein during the engine off duration, fuel injection and air flow through the engine are ceased.

In an example, the fuel enrichment comprises operating the engine with an air-fuel ratio less than stoichiometry, and wherein adjusting the degree of fuel enrichment further comprises adjusting an amount and duration of fuel enrichment. Adjusting the amount of fuel enrichment based on the engine off duration and engine air amount comprises, as the engine off duration increases, increasing a sum of extra fuel added through the fuel enrichment.

In some examples, the air-fuel ratio during the duration is not changed (e.g., increased) based on the engine off duration, but the total amount of fuel added is increased. For example, as the engine off duration increases, the relative level of richness may decrease, but the duration of the enrichment may increase. The enrichment may be matched with airflow to the engine to deliver an enrichment that is best for the catalyst oxygen regeneration.

In one example, adjusting the duration of fuel enrichment based on the engine off duration and engine air amount comprises as the engine air amount increases, increasing the duration of fuel enrichment. In another example, adjusting the duration of fuel enrichment based on the engine off duration and engine air amount comprises as the engine air amount increases, decreasing a relative richness of the of the fuel enrichment Adjusting the degree of fuel enrichment may further comprise adjusting the degree of fuel enrichment based on one or more of a designated amount of tailpipe NOx and a designated amount of tailpipe hydrocarbon. Adjusting the degree of fuel enrichment may further comprise adjusting the degree of fuel enrichment based on a number of combustion events since initiation of the restart. Adjusting the degree of fuel enrichment based on the engine off duration and engine air amount during the restart may comprise adjusting the degree of fuel enrichment based on the engine off duration and one or more of mass air flow and cylinder air charge.

Another embodiment of a method for an engine comprises during engine operation prior to an automatic stop, adjusting an amount of fuel injected to the engine based on feedback from an exhaust oxygen sensor; and during an engine restart following the automatic stop, adjusting an amount of fuel injected to the engine based on a duration of the automatic stop, regardless of the feedback from the exhaust oxygen sensor.

Adjusting the amount of fuel injected to the engine based on the duration of the automatic stop further comprises increasing a sum of extra fuel injected to the engine by operating with a rich air-fuel ratio, a level of the increasing based on the duration of the automatic stop. A duration of the operation with rich air-fuel ratio may be based on an engine air amount. The automatic stop comprises shutting down the engine based on one or more of an accelerator pedal position, brake pedal position, and engine speed, and wherein during the automatic stop, fuel injection and air flow through the engine are ceased. The amount of fuel injected to the engine during the restart may be further adjusted based on one or more of a designated amount of tailpipe NOx and a designated amount of tailpipe hydrocarbons.

Further, during continued engine operation from the start, after a predetermined number of combustion events from the start, the method may include adjusting the amount of fuel injected once again based on the feedback from the exhaust oxygen sensor even when the exhaust oxygen sensor was sufficiently warm and able to provide feedback information during the engine restart where fuel was adjusted regardless of the feedback from the exhaust oxygen sensor.

A further embodiment of a method for an engine having a catalyst comprises during a first catalyst reactivation event following a first engine off period, performing a first fuel enrichment independent of conditions of the first engine off period; and during a second catalyst reactivation event following a second engine off period, performing a second fuel enrichment dependent on a duration of the second engine off period.

In an example, the first engine off period comprises a deceleration fuel shut off event where fuel injection to the engine is ceased but air flow through the engine is maintained, and the second engine off period comprises an automatic stop event where both fuel injection and air flow through the engine are ceased. In an another example, the first engine off period comprises an engine off period greater than a threshold time, and the second engine off period comprises an engine off period less than the threshold time.

Performing the first fuel enrichment may comprise operating the engine with a first rich air-fuel ratio that is selected regardless of a duration of the first engine off condition, and performing the second fuel enrichment may comprise operating the engine with a second rich air-fuel ratio selected based on the duration of the second engine off period. The first rich air-fuel ratio may be selected based on feedback from an exhaust oxygen sensor, and the second rich air-fuel ratio may be further selected based on an engine air amount during an engine restart following the second engine off period. The engine air amount may comprise one or more of mass air flow and cylinder air charge.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for reactivating a catalyst coupled to an engine comprising:
    deactivating the engine; and
    when the engine is restarted following the deactivation, adjusting, via an electronic controller, a degree of fuel enrichment based on an engine off duration, the duration determined from when the engine is deactivated until the engine is restarted, and an engine air amount during the restart.

2. The method of claim 1, wherein the deactivation comprises automatically stopping the engine via the electronic controller based on one or more of an accelerator pedal position, brake pedal position, and engine speed, and wherein during the engine off duration, fuel injection and air flow through the engine are ceased.

3. The method of claim 1, wherein fuel enrichment comprises operating the engine with an air-fuel ratio less than stoichiometry, and wherein adjusting the degree of fuel enrichment further comprises adjusting, via the electronic controller, an amount and duration of fuel enrichment.

4. The method of claim 3, wherein adjusting the amount of fuel enrichment based on the engine off duration and engine air amount comprises, as the engine off duration increases, increasing, via the electronic controller, a sum of extra fuel added through the fuel enrichment.

5. The method of claim 4, wherein adjusting the duration of fuel enrichment based on the engine off duration and engine air amount comprises, as the engine air amount increases, increasing the duration of fuel enrichment.

6. The method of claim 4, wherein adjusting the duration of fuel enrichment based on the engine off duration and engine air amount comprises, as the engine air amount increases, decreasing a relative richness of the fuel enrichment.

7. The method of claim 1, wherein adjusting the degree of fuel enrichment further comprises adjusting the degree of fuel enrichment based on one or more of a designated amount of tailpipe NOx and a designated amount of tailpipe hydrocarbon.

8. The method of claim 1, wherein adjusting the degree of fuel enrichment further comprises adjusting the degree of fuel enrichment based on a number of combustion events since initiation of the restart.

9. The method of claim 1, wherein adjusting the degree of fuel enrichment based on the engine off duration and engine air amount during the restart comprises adjusting the degree of fuel enrichment based on the engine off duration and one or more of mass air flow and cylinder air charge.

10. A method for an engine having a catalyst, comprising:
An Electronic Control Unit (ECU) performing:
- during a first catalyst reactivation event following a first engine off period, performing a first fuel enrichment independent of conditions of the first engine off period; and
- during a second catalyst reactivation event following a second engine off period, performing a second fuel enrichment dependent on a duration of the second engine off period.

11. The method of claim 10, wherein the first engine off period comprises a deceleration fuel shut off event where fuel injection to the engine is ceased but air flow through the engine is maintained, and wherein the second engine off period comprises an automatic stop event where both fuel injection and air flow through the engine are ceased, where during the first catalyst reactivation event the first fuel enrichment is independent of a deceleration fuel shut off event duration.

12. The method of claim 10, wherein the first engine off period comprises an engine off period greater than a threshold time, and wherein the second engine off period comprises an engine off period less than the threshold time.

13. The method of claim 10, wherein performing the first fuel enrichment comprises operating the engine with a first rich air-fuel ratio that is selected regardless of a duration of the first engine off period, and wherein performing the second fuel enrichment comprises operating the engine with a second rich air-fuel ratio selected based on the duration of the second engine off period, wherein the first rich air-fuel ratio is selected based on feedback from an exhaust oxygen sensor, and wherein the second rich air-fuel ratio is further selected based on an engine air amount during an engine restart following the second engine off period.

14. The method of claim 13, wherein the engine air amount comprises one or more of mass air flow and cylinder air charge.

15. The method of claim 1, further comprising prior to the deactivating of the engine, operating the engine with a first, stoichiometric air-fuel ratio, including supplying fuel to the engine in an amount based on a mass air flow to the engine and the first air-fuel ratio, and during the engine deactivation, supplying no fuel to the engine.

16. The method of claim 15, wherein adjusting the degree of fuel enrichment based on the engine off duration and the engine air amount during the restart comprises:
- when the engine is restarted responsive to an accelerator pedal being depressed by a first, larger amount, adjusting the degree of fuel enrichment to operate the engine with a second, rich air-fuel ratio; and
- when the engine is restarted responsive to the accelerator pedal being depressed by a second, smaller amount, adjusting the degree of fuel enrichment to operate the engine with a third, rich air-fuel ratio, the third air-fuel ratio more rich than the second air-fuel ratio.

17. The method of claim 16, wherein adjusting the degree of fuel enrichment based on the engine off duration and the engine air amount during the restart comprises:
- when the engine is restarted responsive to the accelerator pedal being depressed by the first, larger amount, operating the engine with a first duration of the fuel enrichment; and
- when the engine is restarted responsive to the accelerator pedal being depressed by the second, smaller amount, operating the engine with a second duration of the fuel enrichment, the second duration shorter than the first duration.

* * * * *